United States Patent [19]
Lucenti

[11] 3,791,015
[45] Feb. 12, 1974

[54] METHOD OF REPAIRING A BEAM BLANK MOLD

[75] Inventor: Gary S. Lucenti, Sault Ste. Marie, Canada

[73] Assignee: The Algoma Steel Corporation, Limited, Sault Ste. Marie, Canada

[22] Filed: Oct. 17, 1972

[21] Appl. No.: 298,441

[52] U.S. Cl............... 29/401, 164/273 R, 249/205
[51] Int. Cl............................................. B23p 7/00
[58] Field of Search............ 29/401, 402; 76/107 R; 249/205; 164/273 R

[56] References Cited
UNITED STATES PATENTS

| 1,884,590 | 10/1932 | Davies | 76/107 R |
| 3,416,222 | 12/1968 | Pearson | 164/273 R X |
| 3,629,928 | 12/1971 | Hammerle | 29/402 |
| 3,662,814 | 5/1972 | Kipp et al. | 164/273 R X |
| 3,735,801 | 5/1973 | Burkhardt | 164/273 R |

FOREIGN PATENTS OR APPLICATIONS

| 571,870 | 4/1962 | Belgium | 249/205 |

Primary Examiner—Charles W. Lanham
Assistant Examiner—D. C. Reiley, III

[57] ABSTRACT

A method of repairing the worn joint in a mold particularly a beam blank mold formed of two halves by machining the worn joint to a recess of predetermined shape of selected dimensions and mechanically attaching preferably pinning a copper containing strip in said recess to have a precise fit therein and to form a substantially continuous surface in said mold.

4 Claims, 5 Drawing Figures

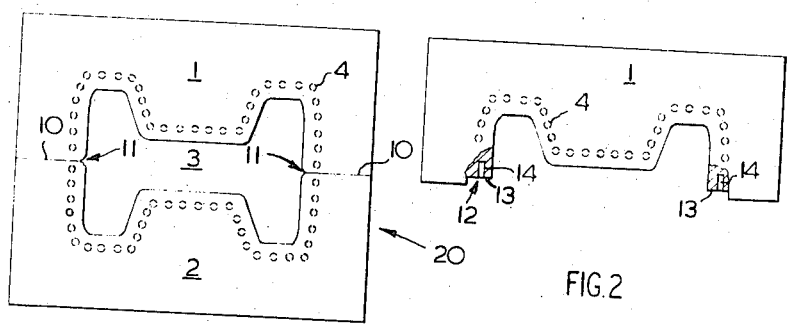
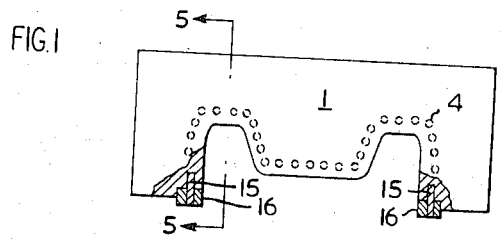
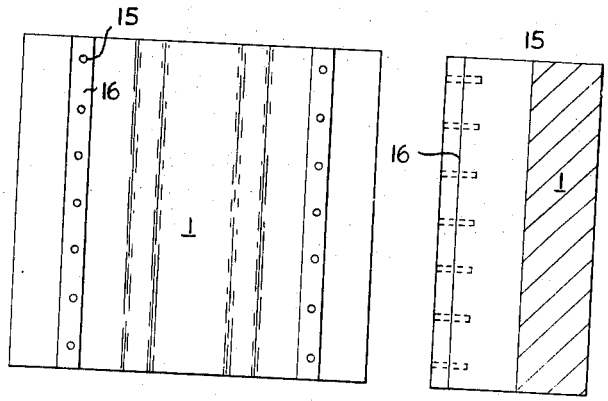

METHOD OF REPAIRING A BEAM BLANK MOLD

The present invention relates to molds and in particular to molds for use in the continuous casting of elongate ferrous articles such as beam blanks. The present invention particularly relates to the repair of such molds and also includes such molds so repaired.

In the casting of elongate ferrous articles such as beam blanks as disclosed in Canadian Patent No. 797,137 to Pearson issued Oct. 22, 1968 the mold used is formed of two copper halves which are joined tightly together in use by means of jack bolts such that the mold can be opened and closed when desired. This allows for the tendency of the blanks formed by the mod to shrink and hang up in the wet fluid areas and prevents the solidified blank from damaging the mold interior if there is a withdrawal from this area. The mold is cooled by means of water cooling channels drilled around the perimeter of the mold cavity. It is however found that with such beam blank molds used in continuous casting that during casting wear occurs on the internal face of the mold cavity at the interface where the two mold halves tightly abut each other with the result that molten metal flows into the wear recess so formed where it is rapidly solidified and thus forms a drag on the metal strand passing through the mold. This drag when it becomes of sufficient size causes metal breakout from the strand leaving the mold cavity which is unacceptable and the mold then either has to be repaired or replaced.

The mold may simply be repaired by machining the abutting faces of the mold halves at the joint, further such machining alters the dimensions of the beam blanks formed by the mold which is undesirable and further due to the proximity of the cooling water channels this machining cannot be repeated a significant number of times. The mold may also be repaired by welding copper into the wear recess at the interface to provide an even surface in the mold cavity. It has however been found that the welding process affects the hardened copper containing metal of each of the mold halves adjacent the recess and is thus unsatisfactory.

It has now been found that a mold used in the continuous casting of elongate ferrous articles, in particular a beam blank mold may be readily repaired by machining the worn recess at the interface between the mold halves to a predetermined regular shape of selected dimensions and mechanically attaching to one wall of the recess with one of the mold halves a strip of copper containing metal of said predetermined regular shape and dimensions.

According to the present invention therefore there is provided a method of repairing a mold used in the continuous casting of elongate ferrous articles, said mold being formed by releaseably joining a pair of mold halves fabricated from copper containing metal nd having worn during previous continuous casting of steel at the internal juntion of the mold halves which method comprises removing metal from the worn junction to provide a recess at said junction of preselected shape and mechanically fastening a strip of copper containing metal in said recess, said copper containing metal strip being dimensioned to form an essentially precise fit in said recess so as to form a substantially continuous internal surface in said mold. The present invention also provides a repaired mold for use in the continuous casting of elongate ferrous articles, said mold being formed by the releasable joining of a pair of mold halves fabricated from copper containing metal said mold having a recess at the junction of said mold halves, said recess containing a copper strip of copper containing metal mechanically attached to a wall thereof, said strip being dimensioned to have a precise fit in said recess so as to form an essentially continuous surface in said mold.

In the process of the present invention the mold having the worn internal junction of the mold halves is taken out of line, is split into the two mold halves, the mold halves are then machined to remove metal from the worn faces to provide a recess of predetermined shape and dimensions and a copper containing metal strip is mechanically attached and preferably pinned into the machined portion of one of the mold halves and the mold is then re-assembled the copper containing strip being dimensioned to have a precise fit in the recess so formed on assembly to provide a smooth surface on the internal wall of the mold.

It will be realized that by the method of the present invention the mold can be repaired a significant number of times by merely removing the previous copper containing strip, re-machining the recess to a slightly larger dimension and inserting a larger copper strip and mechanically attaching it to one of the walls of the recess.

The present invention will be further illustrated by way of the accompanying drawings in which:

FIG. 1 is a schematic plan view of a mold for use in the production of the continuous casting of symmetrical beam blank, the mold being in its worn condition.

FIG. 2 is a plan view partly broken away showing one half of the mold of FIG. 1 in its first stage of repair.

FIG. 3 is a planned view partly broken away showing the mold half of FIG. 2 in a later stage of repair.

FIG. 4 is a side view of the mold half of FIG. 3 and

FIG. 5 is a section taken along the line 5—5 in FIG. 3.

Referring to the drawings, the mold 20 is of a high conductivity copper-chromium-zirconium alloy. The mold 20 is in complimentary cast forged and machine halves 1 and 2 each having an internal surface profile so that together the mold halves define an open end casting of a shape which approximates to the shape of the beam part of greater dimension. The two halves are located by dowels (not shown) and are clamped together with high tension steel bolts (not shown). The water cooling of the mold passes through vertical channels 4 and water is supplied and removed from channel 4 by means of manifolds (not shown). Thus the beam blank mold is similar to and operated in a similar manner to that disclosed in the aforesaid Canadian Patent No. 797,137.

Referring to FIG. 1, when the joint 10 between the mold halves 1 and 2 is worn, as shown at 11, steel flows into the worn joint and is rapidly solidified to form fins which causes a drag on the steel strand passing through mold 20 and when the drag becomes sufficient causes a metal breakout from the steel.

Before this point is reached, the mold 20 is taken off line and taken apart. One half 1 of the mold is machined as shown in FIG. 2 to provide a recess 12 of predetermined shape which recess 12 includes in a wall 13 and longtitudinal spaced recesses 14 for the accomodation of pins. The other mold half two is machined in a similar manner but does not include the recess 14. A strip 16 of copper alloy is pinned by pins 15 in the recess 12 in the mold half 1 the pins 15 being accomodated in the recess 14. The copper alloy strip 16 is dimensioned to precisely fill the cavity formed between the recess 12 on assembly of the mold half 1 and 2. The mold halves 1 and 2 are reassembled to form the mold which is then put back on line. It will be readily seen when further wear takes place between the joints that it is a simple manner to remove the copper alloy 16, further machine the recess 12 and 14 and replace the copper strip 16 with a larger strip of predetermined dimension to fill the new cavity formed by the remachined recess 12. In this way the mold is reusable a substantial number of times.

The embodiments of the invention in which an exclusive property or privilege is claimed are defined as follows:

1. A method of repairing a mold in the continuous casting of elongate ferrous articles, said mold being formed by releasably joining a pair of mold halves, fabricated from a copper containing metal and having worn during previous continuous casting of the articles at the internal junction of the mold halves which method comprises removing metal from the worn junction to provide a recess at said junction of preselected shape and mechanically fastening a strip of copper containing metal in said recess said copper containing metal strip being dimensioned to form an essentially precise fit in said recess so as to form a substantially continuous surface.

2. A method as claimed in claim 1 in which the copper containing metal strip is pinned to one of the side walls of said recess.

3. A method as claimed in claim 1 in which the mold is further repaired and in which the copper containing metal strip previously used to repair the junction is removed, further metal is removed from the recess to a larger preselected shape and a strip of copper containing metal is attached to one of the walls in said recess, said copper containing strip being dimensioned to form an essentially precise fit in said larger recess.

4. A method as claimed in claim 1 in which the mold is a beam blank mold.

* * * * *